US005492614A

United States Patent [19]

Zawacky et al.

[11] Patent Number: 5,492,614

[45] Date of Patent: Feb. 20, 1996

[54] METHOD OF ELECTRODEPOSITION USING AN ELECTROCOATING COMPOSITION CONTAINING A LOW VOLATILE ORGANIC CONTENT PIGMENT GRIND COMPOSITION

[75] Inventors: Steven R. Zawacky, Pittsburgh; Jeffrey G. Koren, Clinton Township, Butler County; Mark L. Follet, Gibsonia; Patricia A. Aikens, Rosemont Township, Delaware County, all of Pa.

[73] Assignee: PPG Industries, Inc., Pittsburgh, Pa.

[21] Appl. No.: 248,984

[22] Filed: May 25, 1994

[51] Int. Cl.$^{6}$ .......... C25D 5/50

[52] U.S. Cl. .......... 205/224; 205/229; 205/317; 204/493; 204/496

[58] Field of Search .......... 205/224, 229, 205/317; 204/181.6, 181.4

[56] References Cited

U.S. PATENT DOCUMENTS

| | | | |
|---|---|---|---|
| 3,701,746 | 10/1972 | Johnson | 524/317 |
| 3,749,657 | 7/1973 | Le Bras et al. | 204/181 |
| 3,919,152 | 11/1975 | Krupp et al. | 260/29.4 WA |
| 4,093,666 | 6/1978 | Arpe | 260/615 A |
| 4,104,100 | 8/1978 | Anders et al. | 204/181.4 |
| 4,133,791 | 1/1979 | Kemenator | 524/377 |
| 4,302,560 | 11/1981 | Becher et al. | 525/327 |
| 4,512,861 | 4/1985 | Doroszkowski | 204/181.4 |
| 4,605,690 | 8/1986 | Debroy et al. | 523/414 |
| 4,666,970 | 5/1987 | Zwack et al. | 524/399 |
| 4,687,789 | 8/1987 | Gonnet | 524/377 |
| 4,810,738 | 3/1989 | Caridi | 524/317 |
| 4,891,111 | 1/1990 | McCollum et al. | 204/181.7 |
| 5,045,587 | 9/1991 | Tanaka | 524/308 |
| 5,074,979 | 12/1991 | Valko et al. | 204/181.7 |
| 5,084,505 | 1/1992 | Biale | 524/317 |
| 5,098,478 | 3/1992 | Krishman | 524/377 |
| 5,169,894 | 12/1992 | Holland | 524/377 |
| 5,194,547 | 3/1993 | Ohashi et al. | 526/266 |
| 5,260,135 | 11/1993 | Corrigan et al. | 428/416 |
| 5,284,894 | 2/1994 | Wasyliw | 524/377 |
| 5,324,764 | 6/1994 | Fujita | 524/377 |

FOREIGN PATENT DOCUMENTS 0576943 6/1993 European Pat. Off. .

OTHER PUBLICATIONS

MAPEG® 400 ML PEG (400) Monolaurate, Technical Bulletin, rev. 01 Dec. 1993.

MAPEG® 300 MOT PEG Fatty Acid Ester, Technical Bulletin, rev. 01 Dec. 1993.

MAPEG® 200 ML PEG (200) Monolaurate, Technical Bulletin, rev. 01 Dec. 1993.

MACOL® TD 3 POE (3) Tridecyl Ether, Technical Bulletin, rev. 01 Dec. 1993.

MAPEG® 400 MS PEG (400) Monostearate, Technical Bulletin, rev. 01 Dec. 1993.

MACOL® SA 2 POE (2) Stearyl Ether, Technical Bulletin, rev. 01 Dec. 1993.

MACOL® LA 4 Lauryl Alcohol Polyether, Technical Bulletin, rev. 01 Dec. 1993.

MACOL® OP 5 POE (5) Octyl Phonol, Technical Bulletin, rev. 01 Dec. 1993.

MACOL® SA 5 POE (5) Stearyl Ether, Technical Bulletin, rev. 01 Dec. 1993.

Macol® OP 3 POE (3) Octyl Phenol, Technical Bulletin, rev. 01 Dec. 1993.

*Primary Examiner*—John Niebling

*Assistant Examiner*—Edna Wong

*Attorney, Agent, or Firm*—Linda Pingitore; Dennis G. Millman

[57] ABSTRACT

A method of electrocoating an electroconductive substrate utilizes an aqueous electrocoating composition containing an electrodepositable water dispersible film forming polymer and a pigment grind composition. The pigment grind composition contains pigment, electrodepositable water dispersible acrylic polymer and a reactive diluent. The reactive diluent has a number average molecular weight of between about 200 and about 2500 and is selected from polyalkylene glycols, polyalkylene glycol ethers, glycol ether formals or mixtures of these. The pigment grind composition has a volatile organic content of less than two pounds per gallon. The method is particularly suitable for anodic electrodeposition.

20 Claims, No Drawings

METHOD OF ELECTRODEPOSITION USING AN ELECTROCOATING COMPOSITION CONTAINING A LOW VOLATILE ORGANIC CONTENT PIGMENT GRIND COMPOSITION

CROSS REFERENCE TO RELATED APPLICATIONS

This application is related to U.S. Ser. No. 08/249,007 filed May 24, 1994 entitled Low Volatile Organic Content Pigment Grind Composition.

BACKGROUND OF THE INVENTION

The present invention relates to methods of electrodeposition, particularly anodic electrodeposition.

Manufacturers of industrial products such as metal furniture, appliances and other small to moderate sized metal parts to a large extent consider electrodeposition the method of choice at least for priming the metal part and in many instances also for topcoating to produce the finished product. Such manufacturers have come under increased pressure in recent years to minimize organic solvent emissions in their manufacturing process, in most instances a maximum limit being placed on total emissions for the entire coating operation. Since electrodeposition often is only one aspect of the coating operation which will liberate volatile solvents, it has become critical to achieve minimal to no solvent emissions in each aspect of the coating operation, in particular the electrodeposition process.

Typically, volatile organic solvents are introduced in the electrodeposition process from solvents used to formulate the aqueous electrocoating composition. These are often introduced during preparation of pigment grind compositions which are used to incorporate a pigment component into the electrocoating composition. Generally, a pigment grind composition is prepared by blending pigment, dispersing agent or grind vehicle and other optional additives together with organic solvent into a paste which is then blended with a major portion of the film forming vehicle to produce the final coating composition. Depending upon the pigment and grind vehicle, excessive amounts of organic solvent may be required to incorporate and adequately disperse the pigment.

There is a need, therefore, for a method of electrodeposition which has minimal volatile organic content introduced with the pigment grind composition.

SUMMARY OF INVENTION

In accordance with the present invention there is provided a method of electrocoating an electroconductive substrate serving as a charged electrode in an electrical circuit comprising said electrode and an oppositely charged counter electrode, at least one of said electrodes being immersed in an aqueous electrocoating composition. Electric current is then passed between the electrodes to cause deposition of the aqueous electrocoating composition on the substrate as a substantially continuous film. The deposited composition is then dryed or heated at elevated temperature to form an at least partially cured film.

In a preferred method of the present invention, the substrate serves as the anode in the aforedescribed electrical circuit and the coating is deposited on the anode.

The aqueous electrocoating composition comprises (a) an electrodepositable water dispersible polymer, and (b) a pigment grind composition having a volatile organic content (VOC) of less than 2 pounds per gallon comprising a pigment, an electrodepositable water-dispersible acrylic polymer and a reactive diluent having a number average molecular weight of between about 200 and about 2500 selected from the group consisting of polyalkylene glycols, polyalkylene glycol esters, glycol ether formals, and mixtures thereof.

DETAILED DESCRIPTION OF THE INVENTION

The method of electrocoating of the present invention is applicable to anodic as well as cathodic electrodeposition, although anodic electrodeposition is preferred herein. Generally stated, electrocoating a substrate involves use of an electroconductive substrate which serves as a charged electrode in an electrical circuit including the charged electrode (substrate) and an oppositely charged counter electrode. At least one of the electrodes is immersed in an aqueous electrocoating composition which is caused to deposit on the substrate as a substantially continuous film by the passage of an electric current between the electrodes. The deposited composition is then dryed or cured by heating at elevated temperatures to form an at least partially cured film.

In anodic electrodeposition which is preferred, the substrate serves as the anode in the aforedescribed electrical circuit and is immersed in the aqueous electrocoating composition.

A wide variety of electrodepositable film forming polymers are known and can be used in formulating the aqueous electrocoating composition so long as the film forming polymer is "water dispersible" which herein means, adapted to be solubilized, dispersed or emulsified in water. That is, polymers which can be classified, depending upon their dispersed state, as solution polymers, dispersion polymers or suspension polymers are all suitable for the purposes of the present invention.

The water dispersible polymer is ionic in nature, that is, the polymer will contain anionic functional groups to impart a negative charge or cationic functional groups to impart a positive charge.

Water dispersible film forming polymers used in the cationic electrodeposition coating process have a cationic functional group such as a primary, secondary or tertiary amine moiety as a positively chargeable hydrophilic group. Examples of suitable film forming resins include amine salt group containing resins such as the acid-solubilized reaction products of polyepoxides and primary or secondary amines such as those described in U.S. Pat. Nos. 3,984,299 column 3 lines 16 to 68, column 4 and column 5 lines 1 to 3; 3,947,338 column 1 lines 57 to 68, column 2 lines 1 to 64, column 4 lines 31 to 68 and column 5 lines 1 to 29; 3,947,339 column 3 lines 50 to 68, column 4, column 5 and column 6 lines 1 to 31, said patents incorporated by reference herein. Besides the epoxy-amine reaction products, water dispersible film forming polymers can also be selected from cationic acrylic resins such as those described in U.S. Pat. Nos. 3,455,806 and 3,928,157 column 2 lines 30 to 68 and column 3 lines 3 to 21, said patents incorporated by reference herein.

Besides amine salt group containing resins, quaternary ammonium salt group-containing resins can also be employed. Examples of these resins are those which are formed from reacting an organic polyepoxide with a tertiary amine salt. Such resins are described in U.S. Pat. Nos. 3,962,165 column 2 lines 3 to 68, columns 3 through 9 and column 10 lines 1 to 64; 3,975,346 column 1 lines 62 to 68, columns 2 through 6, column 7 lines 1 to 23, column 10 lines 33 to 68, columns 11 through 14 and column 15 lines 1 to 64; and 4,001,101 column 2 lines 37 to 68, columns 3 through 8 and column 9 lines 1 to 19, said patents incorporated by reference herein. Examples of other cationic resins are ternary sulfonium salt group-containing resins and quaternary phosphonium salt group-containing resins such as those described in U.S. Pat. Nos. 3,793,278 and 3,984,922, respectively, said patents incorporated by reference herein. Also, water dispersible film forming polymers which cure via transesterification such as described in European Application No. 12463 can be used. Further, cationic compositions prepared from Mannich bases such as those described in U.S. Pat. No. 4,134,932 can also be used, said patent incorporated by reference herein.

Further suitable water dispersible film forming polymers are those positively charged resins which contain primary and/or secondary amine groups. Such resins are described in U.S. Pat. Nos. 3,663,389; 3,947,339; and 4,116,900. Particularly preferred are positively charged resins which contain primary and tertiary amine groups. In U.S. Pat. No. 3,947,339, a polyketimine derivative of a polyamine such as diethylene triamine or triethylene tetraamine is reacted with a polyepoxide. When the reaction product is neutralized with acid and dispersed in water, free primary amine groups are generated. Also, equivalent products are formed when polyepoxide is reacted with excess polyamines such as diethylene triamine and triethylene tetraamine and the excess polyamine vacuum stripped from the reaction mixture. Such products are described in U.S. Pat. No. 3,663,389 and 4,116,900 columns 3 through 5 and column 6 lines 1 to 2, said patents incorporated by reference herein.

Water dispersible polymers used in formulating aqueous electrocoating compositions for the anodic electrodeposition coating process must have an anodic functional group, such as, a carboxyl group for rendering the polymer hydrophilic. That is, the polymer is not soluble or dispersible in water in the form of a free acid but becomes soluble or dispersible to make a stable aqueous solution or dispersion when a sufficient amount of acid functionality is neutralized with base. A variety of such carboxylic acid containing polymers are known including, for example, the reaction product or adduct of a drying oil or semi-drying oil fatty acid ester with a dicarboxylic acid or anhydride. Another vehicle comprises a fatty acid ester, unsaturated acid or anhydride reaction produces and any additional unsaturated modifying materials which are further reacted with polyol. Also suitable are the at least partially neutralized interpolymers of hydroxyalkyl esters of unsaturated carboxylic acids, unsaturated carboxylic acid and at least one other ethylenically unsaturated monomer. Still another electrodepositable vehicle of desirable properties comprises an alkyd-amine vehicle, that is, a vehicle containing an alkyd resin and an amine-aldehyde resin. Yet another electrodepositable composition of desirable properties comprises mixed esters of a resinous polyol. These compositions are described in detail in U.S. Pat. No. 3,749,657, in particular column 2, lines 16 to 75, column 8, lines 1 to 75, column 9, lines 1 to 75 and column 10, lines 1 to 13, all of which are incorporated by reference herein. Other acid functional polymers can also be used such as phosphatized polyepoxide or phosphatized acrylic polymers well known to those skilled in the art.

As was mentioned above, anodic electrodeposition is the preferred method of electrocoating for the present invention. A particularly preferred electrodepositable water dispersible polymer for use as a film forming vehicle is a carboxylic acid functional water dispersible acrylic polymer having very low volatile organic content (less than 0.5 pounds per gallon) and prepared from a vinyl monomer component comprising from about 15 percent to about 35 percent of vinyl aromatic monomer, preferably styrene, from about 40 percent to about 60 percent of an alkyl acrylate, preferably n-butyl acrylate, from about 5 percent to about 20 percent of a hydroxy functional alkyl acrylate, preferably hydroxyethyl acrylate and from about 8 percent to about 15 percent of acrylic or methacrylic acid, preferably methacrylic acid. Although optional up to about 2 percent of 2-acrytamido-2 -methylpropansulfonic acid (commercially available as AMPS® monomer from Lubrizol Corporation) is preferably added to introduce sulfonic acid functionality which improves cure response in aminoplast cured electrocoating compositions. The water dispersible acrylic polymer is preferably prepared in n-butanol or other such volatile solvent like isobutanol or isopropanol which can be removed by stripping at the completion of the polymerization.

When this low volatile organic content film forming acrylic polymer is used in conjunction with a preferred pigment grind composition having a low volatile organic content, as described below, a particularly advantageous electrocoating composition results with minimal volatile content but having excellent film properties comparable to compositions utilizing organic solvent containing film forming vehicles.

The water dispersible film forming polymer used as the film forming vehicle in the electrocoating composition can be the same or different from the water dispersible acrylic polymer used as the vehicle in the pigment grind composition described below. Preferably the water dispersible film forming polymer and the polymer for the pigment grind vehicle are the same.

The pigment grind compositions of the present invention contain pigment, a water dispersible acrylic polymer as the grind vehicle and a reactive diluent. "Water dispersible" herein means adapted to be solubilized, dispersed or emulsified in water. That is, polymers which can be classified, depending upon their dispersed state, as solution polymers, dispersion polymers or suspension polymers are all suitable for use herein.

The compositions can be used in both anodic and cathodic electrocoat compositions, although anodic electrocoat compositions are preferred. For such applications, the water dispersible acrylic polymer should be electrodepositable as is well known to those skilled in the art. Briefly, that is, an electrodepositable polymer is ionic in nature. Depending upon the particular method of electrodeposition, the polymer will contain anionic functional groups to impart a negative charge (anodic electrodeposition) or cationic functional groups to impart a positive charge (cathodic electrodeposition), the respective functional groups being appropriately neutralized with base or acid to solubilize the polymer in water.

The use of a reactive diluent reduces the need for volatile organic solvents to control viscosity, thus producing a pigment grind composition of low volatile organic content (VOC). The VOC of the pigment grind compositions of the present invention is generally less than 2.0 pounds per gallon, preferably less than 1.5 pounds per gallon, more preferably less than 1.0 pounds per gallon, most preferably less than 0.5 pounds per gallon.

The reactive diluent can be incorporated into the pigment grind composition of the present invention by simply blending it with the water-dispersible acrylic polymer and the pigment. Preferably, the water-dispersible acrylic polymer is polymerized in the presence of the reactive diluent.

Suitable reactive diluents for use in the present invention have a number average molecular weight of between about 200 and about 2500, preferably between about 250 and about 1000, more preferably between about 300 and about 800, as determined by gel permeation chromatography (GPC) using polystyrene as a standard. The diluent is selected from the group consisting of polyalkylene glycols, polyalkylene glycol esters, glycol ether formals, and mixtures thereof. Preferably the reactive diluent is a polyalkylene glycol, polyalkylene glycol ester, or mixture thereof.

Examples of polyalkylene glycols useful in the present invention include polypropylene glycol, polyethylene glycol, and polybutylene glycol. For the instant electrocoating applications, polypropylene glycol is the preferred polyalkylene glycol since it has limited solubility in water, enhancing the electrocoatability of electrocoat compositions incorporating the pigment grind composition. If desired, suitable materials can be commercially obtained and include the ARCOL® brand series of materials commercially available from Arco Chemical Co. and the NIAX® brand series of materials commercially available from Union Carbide.

Examples of polyalkylene glycol esters include polyethylene glycol esters and polypropylene glycol esters. Examples of such esters include mono and di esters formed by the reaction of either polyethylene glycol or polypropylene glycol with a monocarboxylic acid having from 1 to 18 carbon atoms, preferably 8 to 12 carbon atoms. Suitable monocarboxylic acids used to prepare the ester include caprylic, capric, lauric, myristic, palmitic, stearic, oleic, linoleic, and linolenic acid. Again, if desired, suitable materials can be commercially obtained and include the MAPEG® brand series of materials commercially available from PPG Industries, Inc., Specialties Chemicals, Chemicals Group, as well as the PEG® brand series of materials commercially available from Henkel Corporation. Preferably the polyalkylene glycol ester is polyethylene glycol monolaurate, for example, MAPEG® 400 ML or PEG® 400 Monolaurate.

Suitable glycol ether formals can be formed by the reaction of formaldehyde and a glycol ether. Examples of glycol ethers useful for practicing the present invention include diethylene glycol monobutyl ether, diethylene glycol monohexyl ether, ethylene glycol monobutyl ether, and ethylene glycol monohexyl ether. Preferably the glycol ether formal is formed by the reaction of formaldehyde and diethylene glycol monobutyl ether. Although one skilled in the art readily appreciates the manner of preparing the aforesaid glycol ether formals, reference is made to U.S. Pat. No. 4,891,111, column 3, lines 14 to 42, incorporated by reference herein, for a more detailed discussion.

The water-dispersible acrylic polymer which is used as the grind vehicle is prepared from a vinyl monomer component. Typically the acrylic polymer is a copolymer of one or more alkyl esters of acrylic acid or methacrylic acid optionally together with one or more other polymerizable ethylenically unsaturated monomers. Suitable alkyl esters of acrylic acid or methacrylic acid include ethyl acrylate, n-butyl acrylate, 2-ethylhexyl acrylate, methyl methacrylate, ethyl methacrylate, and n-butyl methacrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. Additionally suitable ethylenically unsaturated monomers are functional monomers including acrylic acid, methacrylic acid, and hydroxyl functional acrylates and methacrylates such as hydroxyethyl acrylate, hydroxyethyl methacrylate, hydroxypropyl acrylate, and hydroxypropyl methacrylate.

A preferred polymer is prepared from about 15 percent to about 35 percent of a vinyl aromatic monomer, preferably styrene; from about 40 percent to about 60 percent of an alkyl acrylate, preferably n-butyl acrylate; from about 5 percent to about 20 percent of a hydroxyl functional vinyl monomer, preferably hydroxy ethyl acrylate; and from about 8 percent to about 15 percent of acid functional monomer, preferably methacrylic acid. Although optional, up to about 2 percent of 2-acrylamido-2-methylpropanesulfonic acid (commercially available as AMPS® monomer from Lubrizol Corporation) is preferably added to introduce sulfonic acid functionality which has been observed to improve cure response in aminoplast cured coating compositions prepared with the claimed pigment grind composition.

The water-dispersible acrylic polymer is typically prepared by solution polymerization techniques, known to those skilled in the art. Generally the vinyl monomer component is polymerized in the presence of a suitable free radical initiating catalyst such as organic peroxides or azo compounds, for example benzoyl peroxide, t-butyl perbenzoate, or N,N'-azobis-(isobutyronitrile). The amount of catalyst can vary widely depending upon the particular polymerization conditions, although usually, from about 0.5 percent to about 3 percent is used. In a preferred embodiment of the present invention the vinyl monomer component is also polymerized in the presence of the reactive diluent as described in detail above with only a minor amount of organic solvent exemplified by alcohols including isopropanol, isobutanol, and n-butanol, preferably isobutanol; aromatic solvents such as xylene and toluene; ketones such as methyl amyl ketone; and glycol ethers such as ethylene glycol monobutyl ether and ethylene glycol monohexyl ether. The solvent is selected such that it solubilizes the monomers and can be readily removed by distillation at the completion of the polymerization. The completion of the polymerization is determined based on the half-life of the particular free radical initiating catalyst chosen, as is well understood by those skilled in the art.

Rather than polymerizing the vinyl monomer component in the presence of the aforesaid reactive diluent, alternatively, after polymerization of the water dispersible acrylic polymer is complete, the reactive diluent can be added to the acrylic polymer to reduce viscosity. Pigment is then incorporated as described below. If desired, organic solvent introduced during polymerization of the acrylic polymer can be removed by stripping to reduce volatile organic content.

The water dispersible acrylic polymer (grind vehicle) is preferably a base neutralized carboxylic acid functional polymer. The polymer is typically prepared as described above having an acid value ranging from about 12 to about 130 (mg KOH/gram of polymer), preferably from about 50 to about 90, as determined by conventional potentiometric titration techniques. The polymer is dispersed in water by neutralization with a suitable base such as for example diisopropanol amine which is preferred, diethanoi amine, ammonia or triisopropanol amine.

The aforesaid acrylic polymer generally has a number average molecular weight ranging from about 1000 to about 15,000, preferably from about 1000 to about 8000, as determined by GPC using polystyrene as a standard.

Suitable pigments for use in the present invention can be any of the conventional inorganic types including, for example, iron oxides, lead oxides, strontium chromate, carbon black, coal dust, titanium dioxide, talc, barium sulfate, as well as color pigments such as cadmium yellow, cadmium red, chromium yellow and the like. In addition organic pigments such as napthol red, pthalocyanine blue or green, or quinacridone red can be used. Moreover, mixtures of organic and inorganic pigments can be used.

Irrespective of whether the acrylic grind vehicle is prepared by polymerization in the presence of the reactive diluent or the reactive diluent is post added to the grind vehicle, as detailed above, dispersion of the pigment is accomplished by the use of a pigment grinding mill such as a sand mill, ball mill or roller mill according to well known techniques.

The pigment is combined with the grind vehicle and neutralizing base in an aqueous medium under agitation and subsequently ground using grind media for a period of time ranging from about 30 minutes to about 90 minutes, preferably about one hour, and at a temperature of about 35° C. to about 55° C., typically to a Hegman grind ranging from about 5 to about 7, preferably to a grind of about 7. It should be understood that any desired Hegman grind can be obtained. Suitable grind media include ceramic beads, glass beads or metallic beads. Ordinary tap water can be used as the aqueous medium, but deionized water is preferred, generally having a conductivity of less than about 15 micromhos. Optionally there can be present various additives such as surfactants, wetting agents and the like which are typically combined and milled along with the pigment and vehicle as described above.

In the practice of the present invention the pigment content of the composition is usually expressed as the pigment-to-binder ratio. This generally ranges from about 1:1 to about 10:1, preferably about 1:1 to about 6:1. The other additives mentioned above are usually present in amounts ranging from about 0.1 percent to about 3 percent by weight, the percentages based on the total weight of resin solids of the electrocoat composition.

The pigment grind compositions of the present invention are particularly advantageous in that they have a low volatile organic content, as mentioned previously, which minimizes environmental concerns over solvent emissions. Moreover, the compositions are versatile in that a variety of organic, inorganic and mixtures of these pigments can be ground quickly and efficiently, typically in about an hour. Even pigments which are characteristically difficult to grind such as transparent yellow iron oxide and transparent red iron oxide, can be readily processed. The pigment grind compositions are also useful in preparing tint pastes which are used to modify the color of other pigment grind compositions. In addition, the pigment grind compositions contribute to improved film build, flow and coalesence in the electrocoating compositions to which they are added.

Although the aqueous electrocoating compositions of the present invention can be used without a curing agent in the form of a thermoplastic lacquer which is dried at ambient to slightly elevated temperatures, the compositions are preferably thermosetting compositions cured with a crosslinking agent adapted to react with active hydrogens present on the water dispersible film forming polymer, as described above. Both aminoplast and blocked organic polyisocyanate crosslinking agents are suitable for use in the present invention, although aminoplasts are preferred herein for anodic electrodeposition.

Aminoplast resins are condensation products of amines or amides with aldehydes. Examples of suitable amine or amides are melamine, benzoguanamine, urea and similar compounds. Generally, the aldehyde employed is formaldehyde, although products can be made from other aldehydes such as acetaldehyde and furfural. The condensation products contain methylol groups or similar alkylol groups depending on the particular aldehyde employed. Preferably, these methylol groups are etherified by reaction with an alcohol. Various alcohols employed include monohydric alcohols containing from 1 to 4 carbon atoms such as methanol, ethanol, isopropanol, and n-butanol, with methanol being preferred. Aminoplast resins are commercially available from American Cyanamid Co. under the trademark CYMEL and from Monsanto Chemical Co. under the trademark RESIMENE.

The preferred crosslinkers for use in cathodic electrodeposition are blocked organic polyisocyanates. The polyisocyanates can be fully blocked as described in U.S. Pat. No. 3,984,299 column 1 lines 1 to 68, column 2 and column 3 lines 1 to 15, or partially blocked and reacted with the polymer backbone as described in U.S. Pat. No. 3,947,338 column 2 lines 65 to 68, column 3 and column 4 lines 1 to 30, which are incorporated by reference herein. By "blocked" is meant that the isocyanate groups have been reacted with a compound so that the resultant blocked isocyanate group is stable to active hydrogens at ambient temperature but reactive with active hydrogens in the film forming polymer at elevated temperatures usually between 90° C. and 200° C. Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates such as triisocyanates can be used. An example would include triphenylmethane-4,4',4"-triisocyanate. Isocyanate ()-prepolymers with polyols such as neopentyl glycol and trimethylolpropane and with polymeric polyols such as polycaprolactone diols and triols (NCO/OH equivalent ratio greater than 1) can also be used. Preferred polyisocyanates are mixtures of diphenylmethane -4,4'-diisocyanate and polymethylene polyphenylisocyanates. Such mixtures are commonly referred to as crude MDI or polymeric MDI. A particularly preferred mixture is available from Miles, Inc. as Mondur MRS 2. The polyisocyanate curing agents are typically utilized in conjunction with the active hydrogen containing water dispersible film forming polymer in amounts ranging from about 10 percent by weight to about 75 percent by weight, the percentage based on the total weight of the resin solids.

The aqueous electrocoating compositions of the present invention are in the form of a stable aqueous dispersion. The term "dispersion" is believed to be a two-phase transparent, translucent or opaque resinous system in which the resin is in the dispersed phase and the water is in the continuous phase. By "stable" is meant that the dispersion will not readily settle or is easily redispersible if some sedimentation occurs. The average particle size of the resinous phase is generally less than 10 and usually less than 5 microns, preferably less than 0.5 micron. The concentration of the resinous phase in the aqueous medium is usually at least 1 and usually from about 2 percent by weight to about 60 percent by weight based on weight of the aqueous dispersion. When the electrocoating compositions of the present invention are in the form of resin concentrates, they generally have a resin solids content of about 25 by weight to about 60 percent by weight based on weight of the aqueous dispersion. When the compositions of the present invention are in the form of electrodeposition baths, the resin solids content of the electrodeposition bath is usually within the range of about 5 by weight to about 25 percent by weight based on total weight of the aqueous dispersion.

Besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 4-methoxy-pentanone, ethylene and propylene glycol and the monoethyl, monobutyl and monohexyl ethers of ethylene glycol. The amount of coalescing solvent is generally between about 0.01 and about 25 percent and when used, preferably from about 0.05 to about 5 percent by weight based on weight of the aqueous medium.

The pigment grind composition is utilized in an amount to provide a pigment-to resin ratio in the electrocoatings composition within the range of 0.01:1 to 1:1. Other optional additives described below are usually present in the electrocoating compositions in amounts of about 0.01 to 3 percent by weight based on resin solids.

As mentioned above, there may also be included in the coating composition additives such as anti-oxidants, wetting agents, dryers, anti-foaming agents, suspending agents and the like. It is often desirable to include small amounts of water-miscible organic solvents, which may be added to the resinous vehicle to aid in handling and processing. Examples of such solvents are 4-methoxy-4-methyl-pentanone-2, and other solvents such as dioxane and glycol ethers can be used.

In formulating the water-dispersed electrocoating compositions, ordinary tap water may be employed. However, such water may contain a relatively high level of ions, which, while not ordinarily rendering the electrodeposition process inoperative, may result in variations in the properties of the baths when used for electrodeposition. In such cases, it is often desirable to utilize deionized water from which the free ions have been removed, as by passage through an ion exchange resin, generally having a conductivity of less than 15 micromhos.

As mentioned above, in the preferred anodic electrodeposition process employing the aqueous anionic coating compositions described above, the aqueous composition is placed in contact with an electrically conductive anode and an electrically conductive cathode, with the surface to be coated being the anode. Upon passage of the electric current between the anode and the cathode, while in contact with the bath containing the coating composition, an adherent substantially continuous film of the coating composition is deposited on the anode. This is in contrast to the processes utilizing cationic amine salt group containing resins which deposit on the cathode.

The conditions under which electrodeposition is carried out are, in general, similar to those used in electrodeposition of other types of coatings. The applied voltage may be varied greatly and can be, for example, as low as one volt or as high as several thousand volts, although typically between 50 volts and 500 volts are employed. Current density is usually between about 1.0 ampere and 15 amperes per square foot and tends to decrease during electrodeposition.

After deposition, the coating is dried or cured at elevated temperatures by any convenient method, such as baking in ovens or with banks of infrared heat lamps. Curing temperatures depend principally on the curing agent employed. When the curing agent is a blocked isocyanate such as described above, curing is usually accomplished at between about 75° C. to about 300° C. When the curing agent is an aminoplast, curing is usually accomplished at between about 90° C. and about 200° C.

The method of the present invention is particularly advantageous in that articles can be electrocoated with coating compositions having low volatile organic content and resulting in properties comparable to coatings containing high levels of organic solvent. As was mentioned above in connection with the discription of the pigment grind composition, improvements in film build, flow and coalesence are also realized.

The invention will be described further in conjunction with several examples showing the method and practice of the invention. These examples, however, are not to be construed as limiting the invention to their details. All parts and percentages in the examples as well as throughout the specification are by weight unless otherwise indicated.

EXAMPLES

The following examples illustrate the preparation and evaluation of aqueous electrocoating compositions in accordance with the method of the claimed invention.

Deionized water when utilized in all of the following examples had a conductivity of less than about 15 micromhos.

WATER DISPERSIBLE ACRYLIC POLYMERS (ACRYLIC GRIND VEHICLES)

This example shows the preparation of an acrylic grind vehicle in the presence of a polyethylene glycol monoester as reactive diluent, The grind vehicle was prepared from the following mixture of ingredients:

| Ingredients | Parts by Weight |
|---|---|
| Charge I | |
| n-Butanol | 146.7 |
| PEG 400 ® Monolaurate[1] | 948.6 |
| Charge II | |
| Styrene | 458.8 |
| Methacrylic Acid | 223.2 |
| Butyl Acrylate | 904.6 |
| Hydroxyethyl Acrylate | 177.3 |
| Tertiary Dodecyl Mercaptan | 105.4 |
| n-Butanol | 93.0 |
| Tertiary Butyl Perbenzoate | 40.3 |
| Charge III | |
| n-Butanol | 124.0 |
| Diisopropanol Amine | 0.8 |
| AMPS ® Monomer[2] | 1.2 |
| Charge IV | |
| n-Butanol | 12.4 |
| Tertiary Butyl Perbenzoate | 2.1 |
| Charge V | |
| n-Butanol | 5.5 |
| Tertiary Butyl Perbenzoate | 3.2 |

[1]Polyethylene Glycol 400 monolaurate commercially available from Henkel Corp.
[2]2-Acrylamido-2-methylpropanesulfonic acid commercially available from Lubrizol Corp.

The first portion of the n-butanol and the PEG 400 monolaurate diluent (Charge I) were charged to a reaction vessel and heated to 125° C. under nitrogen. The styrene, methacrylic acid, butyl acrylate, hydroxyethyl acrylate, tertiary dodecyl mercaptan, second portion of n-butanol and first portion of tertiary butyl perbenzoate (Charge II) were charged to an erlenmeyer flask and mixed well. The third portion of n-butanol, diisopropanol amine and AMPS monomer (Charge III) were charged to a second erlenmeyer flask and mixed well until all the AMPS monomer had dissolved. Both monomer mixtures were added dropwise as separate feeds to the hot n-butanol and PEG 400 monolaurate diluent mixture in the reaction vessel over a three hour period while maintaining a 123° to 128° C. reaction temperature.

Upon completion of the additions, the mixture in the reaction vessel was held for half an hour at 123° to 128° C. The second portion of tertiary butyl perbenzoate was then added dropwise over 10 minutes as a solution in the forth portion of n-butanol (Charge IV). Upon completion of the scavanger addition, the reaction mixture was held at 123° to 128° C. for an hour whereupon the third portion of tertiary butyl perbenzoate was added dropwise over 10 minutes as a solution in the fifth portion of n-butanol (Charge V). After the second scavenger charge had been added, the reaction mixture was held an additional hour at 123° to 128° C.

Upon completion of the scavanger holds, the mixture in the reaction vessel was maintained at 123° to 128° C. and the pressure was gradually reduced over the course of an hour while 372 parts by weight of distillate were collected. The stripped mixture was then cooled to give a finished anionic acrylic grind vehicle ready for use as described below.

EXAMPLE 8

This example shows the preparation of an acrylic grind vehicle in the presence of a polypropylene glycol as a reactive diluent. The grind vehicle was prepared from the following mixture of ingredients:

| Ingredients | Parts by Weight |
|---|---|
| Charge I | |
| DOWANOL ® PM[1] | 29.5 |
| ARCOL ® Polyol PPG-2025[2] | 162.0 |
| Deionized Water | 8.0 |
| Charge II | |
| Styrene | 177.4 |
| Methacrylic Acid | 51.6 |
| Butyl Acrylate | 348.3 |
| Hydroxyethyl Acrylate | 67.7 |
| Tertiary Dodecyl Mercaptan | 20.7 |
| ARCOL Polyol PPG-2025 | 25.4 |
| Tertiary Butyl Perbenzoate | 5.9 |
| Charge III | |
| DOWANOL PM | 29.6 |
| Deionized water | 3.4 |
| Diisopropanol Amine | 1.7 |
| AMPS Monomer | 3.2 |
| Charge IV | |
| ARCOL Polyol PPG-2025 | 4.3 |
| Tertiary Butyl Perbenzoate | 3.1 |
| Charge V | |
| Deionized Water | 50.0 |
| Diisopropanol amine | 59.4 |

[1]Propylene Glycol Methyl Ether commercially available from Dow Chemical Co.
[2]Polypropylene Glycol 2025 commercially available from Arco Chemical Co.

The first portions of the DOWANOL PM, deionized water and the PPG-2025 diluent (Charge I) were charged to a reaction vessel and heated to 100° C. under nitrogen. The styrene, methacrylic acid, butyl acrylate, hydroxyethyl acrylate, tertiary dodecyl mercaptan, second portion of PPG-2025 diluent and first portion of tertiary butyl perbenzoate (Charge II) were charged to an erlenmeyer flask and mixed well. The second portions of DOWANOL PM and deionized water, the first portion of diisopropanol amine and AMPS monomer (Charge III) were charged to a second erlenmeyer flask and mixed well until all the AMPS monomer had dissolved. Both monomer mixtures were added dropwise as separate feeds to the hot DOWANOL PM, deionized water and PPG-2025 diluent mixture in the reaction vessel over a three hour period while maintaining a gentle reflux.

Upon completion of the additions, the mixture in the reaction vessel had attained at temperature of 115° C. and was held for half an hour at that temperature. Half of a mixture of the second portion of tertiary butyl perbenzoate and the third portion of the PPG-2025 diluent (Charge IV) was then added dropwise over 5 minutes. Upon completion of the first scavanger addition, the reaction mixture was held at 115° to 120° C. for an hour. Likewise the second half of the scavanger was added over 5 minutes and the hour hold at 115° to 120° C. was repeated.

After completion of the scavanger holds, the third portion of deionized water (Charge V) was added dropwise to the mixture in the reaction vessel and the mixture reheated to 125° C. for an hour while 89 parts of distillate were collected. The mixture was then cooled to 90° C. and the second portion of diisopropanol amine (Charge VI) was added. The stripped and neutralized mixture was then cooled further to give a finished anionic acrylic grind vehicle ready for use as described below.

EXAMPLE C

This example shows the preparation of an acrylic grind vehicle in the presence of a glycol ether formal as reactive diluent. The grind vehicle was prepared from the following mixture of ingredients:

| Ingredients | Parts by Weight |
|---|---|
| Charge I | |
| DOWANOL PM | 98.2 |
| 2-(2-Butoxyethoxy)ethanol formal[1] | 539.8 |
| Deionized Water | 26.6 |
| Charge II | |
| Styrene | 591.3 |
| Methacrylic Acid | 172.0 |
| Butyl Acrylate | 1161.0 |
| Hydroxyethyl Acrylate | 225.8 |
| Tertiary Dodecyl Mercaptan | 69.1 |
| 2-(2-Butoxyethoxy)ethanol formal | 84.5 |
| Tertiary Butyl Perbenzoate | 19.8 |
| Charge III | |
| DOWANOL PM | 98.6 |
| Deionized Water | 11.2 |
| Diisopropanol Amine | 5.8 |
| AMPS Monomer | 10.6 |
| Charge IV | |
| 2-(2-Butoxyethoxy)ethanol formal | 14.4 |
| Tertiary Butyl Perbenzoate | 10.2 |
| Charge V | |
| Deionized water | 250.0 |

-continued

| Ingredients | Parts by Weight |
| --- | --- |
| Charge VI | |
| Diisopropanol Amine | 198.0 |
| Deionized Water | 1127.5 |

[1]Prepared as generally described in U.S. Pat. No. 4,891,111, column 3, lines 14 to 42.

The first portions of the DOWANOL PM, deionized water and the Formal (Charge I) were charged to a reaction vessel and heated to 100° C. under nitrogen. The styrene, methacrylic acid, butyl acrylate, hydroxyethyl acrylate, tertiary dodecyl mercaptan, second portion of Formal and first portion of tertiary butyl perbenzoate (Charge II) were charged to an erlenmeyer flask and mixed well. The second portions of DOWANOL PM and deionized water, the first portion of diisopropanol amine and AMPS monomer (Charge III) were charged to a second erlenmeyer flask and mixed well until all the AMPS monomer had dissolved. Both monomer mixtures were added dropwise as separate feeds to the hot DOWANOL PM, deionized water and Formal mixture in the reaction vessel over a three hour period while maintaining a gentle reflux.

Upon completion of the additions, the mixture in the reaction vessel had attained a temperature of 120° C. and was held for half an hour at that temperature. Half of a mixture of the second portion of tertiary butyl perbenzoate and the third portion of the Formal (Charge IV) was added dropwise over 5 minutes. Upon completion of the first scavanger addition, the reaction mixture was held at 120° to 125° C. for an hour. Likewise the second half of the scavanger was added over 5 minutes and the hour hold at 120° to 125° C. was repeated.

Upon completion of the scavanger holds, the third portion of deionized water (Charge V) was added dropwise to the mixture in the reaction vessel and the mixture reheated to 130° C. for an hour while 460 parts of distillate were collected. The mixture was then cooled to 90° C. and the second portion of diisopropanol amine (Charge VI) was added followed by the fourth portion of deionized water (Charge VII). The stripped, neutralized and diluted mixture was then cooled further to give a finished anionic acrylic grind vehicle ready for use as described below.

EXAMPLE D

This example shows the preparation of an electrodepositable water dispersible acrylic polymer used as a film forming polymer in the electrocoating compositions of Example 1, below. The acrylic polymer was prepared from the following mixture of ingredients:

| Ingredients | Parts by weight |
| --- | --- |
| Charge I | |
| n-Butanol | 238.0 |
| Charge II | |
| Styrene | 333.9 |
| Methacrylic Acid | 95.9 |
| Butyl Acrylate | 657.6 |
| Hydroxyethyl Acrylate | 128.5 |
| Tertiary Dodecyl Mercaptan | 39.4 |
| n-Butanol | 142.0 |
| Tertiary Butyl Perbenzoate | 14.7 |
| Charge III | |
| n-Butanol | 115.6 |
| Diisopropanol Amine | 4.1 |
| AMPS Monomer | 6.1 |
| Charge IV | |
| n-Butanol | 10.2 |
| Tertiary Butyl Perbenzoate | 3.2 |
| Charge V | |
| Deionized Water | 225.0 |
| Charge VI | |
| Diisopropanol Amine | 118.3 |
| Charge VII | |
| CYMEL ® 1130[2] | 321.6 |
| Charge VIII | |
| Deionized Water | 1342.0 |
| Charge IX | |
| Deionized Water | 2380.0 |

[1]Melamine Resin (aminoplast) commercially available from American Cyanamide.

The first portion of the n-butanol (Charge I) was charged to a reaction vessel and heated to reflux under nitrogen. The styrene, methacrylic acid, butyl acrylate, hydroxyethyl acrylate, tertiary dodecyl mercaptan, second portion of n-butanol and first portion of tertiary butyl perbenzoate (Charge II) were charged to an erlenmeyer flask and mixed well. The third portion of n-butanol, diisopropanol amine and AMPS monomer (Charge III) were charged to a second erlenmeyer flask and mixed well until all the AMPS monomer had dissolved. Both monomer mixtures were added dropwise as separate feeds to the hot n-butanol in the reaction vessel over a three hour period while maintaining gentle reflux and a 123° to 128° C. reaction temperature.

Upon completion of the additions, the mixture in the reaction vessel was held for half an hour at 123° to 128° C. Half of a solution prepared from the second portion of tertiary butyl perbenzoate and the fourth portion of n-butanol (Charge IV) was then added dropwise over 10 minutes. Upon completion of the first scavanger addition, the reaction mixture was held at 123° to 128° C. for an hour and then the second portion of the scavanger solution was added dropwise over 10 minutes. After the second scavenger charge had been added, the reaction mixture was held an additional hour at 123 to 128° C.

Upon completion of the scavanger holds, the mixture in the reaction vessel was cooled to 115° C. and the pressure was gradually reduced over the course of an hour while 469 parts by weight of distillate were collected. The mixture was then cooled to 105° C., the vacuum was broken and the first portion of water (Charge V) was added dropwise while distillation continued. After an additional 116 parts by weight of distillate had been collected, the mixture in the reaction vessel was cooled to 93° C. and the second diisopropanol amine charge (Charge VI) was added and mixed in for 30 minutes while maintaining a 92° to 95° C. hold temperature. The CYMEL 1130 resin (Charge VII) was then added and allowed to mix for 60 minutes while the reaction mixture was held at 92° to 95° C.

After the hold was complete, the resin was reverse thinned into the third charge of water (Charge VIII) which had been preheated to 50° C. The resulting dispersion was allowed to cool to 50° C. over the course of an hour and diluted with the fourth charge of water (Charge IX) which had been also preheated to 50° C. The final dispersion was then cooled to room temperature to give a film forming vehicle with a solids content of 27 percent and a particle size of less than 1100 angstroms.

PIGMENT GRIND COMPOSITIONS

The following examples illustrate the preparation of various pigment grind compositions utilizing the acrylic grind vehicles of Examples A to C above.

EXAMPLE I

This example illustrates the preparation of a pigment grind composition using the acrylic grind vehicle of Example A above. The pigment grind composition was prepared from a mixture of the following ingredients.

| Ingredients | Resin Solids (grams) | Pigment Solids (grams) | Weight (grams) |
|---|---|---|---|
| Acrylic Grind Vehicle of Example A | 834.3* | | 834.3 |
| Diisopropanol Amine | | | 97.6 |
| Defoamer[1] | | | 9.1 |
| Deionized Water | | | 1896.2 |
| Titanium Dioxide[2] | | 1796.1 | 1796.1 |
| Clay[3] | | 218.4 | |
| Silica Flatting Agent[4] | | 72.8 | |
| Deionized water | | | 76.1 |
| Total | 834.3* | 2087.3 | 5000.0 |

[1]Commercially available as Foam Kill 639 from Crucible Chemicals
[2]Commercially available as TiPure R900 from E. I. DuPont de Nemours Co.
[3]Commercially available as ASP170 from Engelhard.
[4]Commercially available as Super Fine Super Floss from Strauch Chemical.
*Based on the sum solids of acrylic vehicle plus peg 400 Monolaurate.

All ingredients were pre-mixed under agitation and ground for approximately one hour in a sand mill using zircoa ceramic beads as grind media until a 7+ Hegman grind was obtained. The resultant pigment dispersion had a total resin solids content of 16.7 percent and a total pigment solids content of 41.7 percent.

EXAMPLE II

This example illustrates the preparation of a pigment grind composition using the acrylic grind vehicle of Example B above. The pigment grind composition was prepared from the mixture of the following ingredients.

| Ingredients | Resin Solids (grams) | Pigment Solids (grams) | Weight (grams) |
|---|---|---|---|
| Acrylic Grind Vehicle of Example B | 913.1* | | 913.1 |
| Diisopropanol Amine | | | 16.8 |
| Defoamer[1] | 20.0 | | 36.5 |
| Deionized Water | | | 2195.1 |
| Titanium Dioxide[2] | | 1216.7 | 1216.7 |
| Clay[4] | | 551.6 | 551.6 |
| Carbon Black[5] | | 11.0 | 11.0 |
| Iron Oxides | | 59.2 | 59.2 |
| Total | 933.1 | 1838.5 | 5000.0 |

[1]Commercially available as Surfynol GM from Air Products.
[2]Commercially available as TiPure R900 from E. I. DuPont de Nemours Co.
[3]Commercially available as ASP170 from Engelhard.
[4]Commercially available as Raven 1200 from Columbian Chemical.

-continued

| Ingredients | Resin Solids (grams) | Pigment Solids (grams) | Weight (grams) |
|---|---|---|---|

[5]Commercially available as PS-1420M Bayferrox Yellow from Miles.
*Based on the sum solids of acrylic vehicle plus Arcol Polyol 2025.

All ingredients were pre-mixed under agitation and ground for approximately one hour in a sand mill using zircoa ceramic beads as grind media until a 7+ Hegman grind was obtained. The resultant pigment dispersion had a total resin solids content of 18.6 percent and a total pigment solids content of 36.8 percent.

EXAMPLE III

This example illustrates the preparation of a pigment grind composition using the acrylic grind vehicle of Example C above. The pigment grind composition was prepared from a mixture of the following ingredients:

| Ingredients | Resin Solids (grams) | Pigment Solids (grams) | Weight (grams) |
|---|---|---|---|
| Acrylic Grind Vehicle of Example C | 556.3 | | 1112.5 |
| Diisopropanol Amine | | | 22.7 |
| Deionized Water | | | 1875.4 |
| Defoamer[1] | | | 94.9 |
| Clay[2] | | 568.5 | 568.5 |
| Titanium Dioxide[3] | | 1253.3 | 1253.3 |
| Carbon Black[4] | | 11.4 | 11.4 |
| Yellow Iron Oxide[5] | | 61.3 | 61.3 |
| Total | 556.3 | 1894.5 | 5000.0 |

[1]Commercially available as Surfynol GA from Air Products
[2]Commercially available as ASP170 from Engelhard
[3]Commercially available as TiPure R900 from E.I DuPont de Nemours Co.
[4]Commercially available as Printex 200 from Degussa
[5]Commercially available as PS-140M Bayferrox Yellow from Miles All ingredients were pre-mixed under agitation and ground for approximately one hour in a sand mill using zircoa ceramic beads as grind media until a 7+ Hegman grind was obtained. The resultant pigment dispersion had a total resin solids content of 11.1 percent and a total pigment solids content of 37.9 percent.

EXAMPLE 1

This example illustrates the preparation of an anionic electrocoating composition using the pigment grind composition of Example I and the film forming acrylic polymer of Example D. The coating composition was prepared by mixing under agitation the following materials:

| Ingredients | Resin Solids (grams) | Pigment Solids (grams) | Weight (grams) |
|---|---|---|---|
| Acrylic film forming polymer from Example D | 203.0 | | 724.8 |
| Diisopropanol Amine | | | 6.0 |
| Pigment grind composition of Example I | 50.4 | 126.7 | 298.0 |
| Deionized Water | | | 2771.2 |
| Total | 253.4 | 126.7 | 3800.0 |

EXAMPLE 2

This example illustrates the preparation of an anionic electrocoating composition using the pigment grind composition of Example II. The acrylic polymer used as the film former was the same polymer used as the grind vehicle. The coating composition was prepared by mixing under agitation the following materials:

| Ingredients | Resin Solids (grams) | Pigment Solids (grams) | Weight (grams) |
|---|---|---|---|
| Acrylic polymer of Example B (film former) | 234.4 | | 325.6 |
| Cymel 1130 | 65.2 | | 65.2 |
| Pigment Grind Composition of Example II | 37.0 | 73.3 | 199.1 |
| Deionized Water | | | 4410.1 |
| Total | 336.6 | 73.3 | 5000.0 |

EXAMPLE3

This example illustrates the preparation of an anionic electrocoating composition using the pigment grind composition of Example III. The acrylic polymer used as the film former was the same polymer used as the grind vehicle. The coating composition was prepared by mixing under agitation the following materials:

| Ingredients | Resin Solids (grams) | Pigment Solids (grams) | Weight (grams) |
|---|---|---|---|
| Acrylic polymer of Example C (film former) | 178.1 | | 356.2 |
| CYMEL 1130 | 49.5 | | 49.5 |
| Pigment Grind Composition of Example III | 16.3 | 55.7 | 147.0 |
| Deionized Water | | | 3247.3 |
| Total | 243.9 | 55.7 | 3800.0 |

EVALUATION

Steel test panels (EP1, P60) available from ACT Corporation, Cleveland, Ohio, were coated with each of the anionic electrocoating compositions described in Examples 1, 2, and 3 above. The test panels which were immersed in the anionic electrocoating compositions maintained at 80° F. (27° C.) were coated by applying between 140 to 260 volts as detailed in the table below for 90 seconds to produce a film with an average thickness of about 1.0 mil. The films were cured by baking at 300° F. (149° C.) for 20 minutes. The resultant films were all smooth and had excellent appearance.

The cured films were evaluated for solvent resistance (acetone), pencil hardness, gloss, and salt spray resistance. Pencil hardness, gloss, and salt spray resistance were evaluated according to ASTM Methods detailed below. Solvent resistance was rated by the number of double rubs with an acetone soaked cloth required to remove the coating from the test panel.

All of the cured films exhibited acceptable properties as detailed below. Also, all of the electrocoating compositions of in this evaluation had a volatile organic content of less than 0.5 pounds per gallon.

| Example | Applied Voltage | Acetone Double Rubs | Pencil[1] Hardness | Gloss[2] 60 Deg. | Salt Spray[3] Resistance mm TSL[4] 48 Hours | Salt Spray[3] Resistance mm TSL[4] 96 Hours |
|---|---|---|---|---|---|---|
| 1 | 140–260V | 100 | H-2H | 56 | 2 | 4 |
| 2 | 140–180V | 100 | H | 68 | 4 | 8 |
| 3 | 200–260V | 100 | F-H | 72 | 3 | 8 |

[1]Pencil Hardness measured by ASTM Method D3363
[2]Gloss (60 Degree) measured by ASTM Method D523
[3]Salt Resistance measured by ASTM Method B117
[4]TSL (Total Scribe Lift) as described in ASTM Method B117 of fn. 3 above

What is claimed is:

1. A method of electrocoating an electroconductive substrate serving as a charged electrode in an electrical circuit comprising said electrode and an oppositely charged counter electrode, at least one of said electrodes being immersed in an aqueous electrocoating composition, comprising passing electric current between said electrodes to cause the deposition of the electrocoating composition on the substrate as a substantially continuous film and drying or heating the electrodeposited film at elevated temperatures to form an at least partially cured film, said aqueous electrocoating composition comprising (a) an electrodepositable water dispersible film forming polymer, (b) a pigment grind composition having a volatile organic content (VOC) of less than 1 pound per gallon comprising a pigment, an electrodepositable water-dispersible acrylic polymer, and a reactive diluent having a number average molecular weight of between about 200 and about 2500 selected from the group consisting of polyalkylene glycol mono esters formed by the reaction of polyalkylene glycol with a monocarboxylic acid having between eight and eighteen carbon atoms glycol ether formals, and mixtures thereof.

2. A method of electrocoating an electroconductive substrate serving as an anode in an electrical circuit comprising a cathode and said anode immersed in an aqueous anionic electrocoating composition comprising passing electric current between the cathode and the anode to cause the deposition of the electrocoating composition on the anode as a substantially continuous film and drying or heating the electrodeposited film at elevated temperatures to form an at least partially cured film, said aqueous anionic electrocoating composition comprising (a) an anionic electrodepositable water dispersible film forming polymer, (b) a pigment grind composition having a volatile organic content (VOC) of less than 1 pound per gallon comprising a pigment, an anionic electrodepositable water-dispersible acrylic polymer, and a reactive diluent having a number average molecular weight of between about 200 and about 2500 selected from the group consisting of polyalkylene glycol mono esters formed by the reaction of polyalkylene glycol with a monocarboxylic acid having between eight and eighteen carbon atoms glycol ether formals, and mixtures thereof.

3. The method of claim 1 wherein the electrodepositable water-dispersible acrylic polymer is polymerized from a vinyl monomer component in the presence of the reactive diluent.

4. The method of claim 1 wherein the reactive diluent is post added to the pigment grind composition by blending with the electrodepositable water-dispersible acrylic film forming polymer and pigment.

5. The method of claim 1 wherein the reactive diluent has a number average molecular weight ranging from about 250 to about 1000.

6. The method of claim 5 wherein the reactive diluent has a number average molecular weight ranging from about 300 to about 800.

7. The method of claim 1 wherein the reactive diluent polyalkylene glycol mono ester is formed from a polyalkylene glycol selected from the group consisting of polyethylene glycol and polypropylene glycol.

8. The method of claim 1 wherein the monocarboxylic acid is selected from the group consisting of caprylic, capric, lauric, myristic, palmitic, stearic, oleic, linoleic, and linolenic acid.

9. The method of claim 1 wherein the reactive diluent is a glycol ether formal which is the reaction product of formaldehyde and a glycol ether selected from the group consisting of diethylene glycol monobutyl ether, diethylene glycol monohexyl ether, ethylene glycol monobutyl ether, and ethylene glycol monohexyl ether.

10. The method of claim 1 where the polyalkylene glycol ester is polyethylene glycol monolaurate.

11. The method of claim 1 wherein the acrylic polymer is the polymerization product of a vinyl monomer component comprising a monomer or mixture of monomers selected from the group consisting of alkyl acrylates, alkyl methacrylates, hydroxyl functional acrylates, hydroxyl functional methacrylates, vinyl aromatics, acrylic acid, and methacrylic acid.

12. The method of claim 11 wherein the vinyl monomer component is comprised of a vinyl aromatic monomer which is styrene, an alkyl acrylate which is butyl acrylate, an hydroxyl functional acrylate which is hydroxy ethyl acrylate, and methacrylic acid.

13. The method of claim 12 wherein the vinyl monomer component comprises from about 15 to about 35 percent vinyl aromatic monomer , from about 40 to about 60 percent alkyl acrylate, from about 5 to about 20 percent hydroxyl functional acrylate and from about 8 to about 15 percent methacrylic acid.

14. The method of claim 1 wherein the volatile organic content is less than 0.5 pounds per gallon.

15. The method of claim 1 wherein the pigment is an organic pigment.

16. The method of claim 1 wherein the pigment is an inorganic pigment.

17. The method of claim 1 wherein the pigment is a mixture of organic and inorganic pigments.

18. The method of claim 2 wherein the electrodepositable water dispersible film forming polymer is a base neutralized carboxylic acid functional acrylic polymer.

19. The method of claim 2 wherein the aqueous electrocoating composition further comprises a curing agent adapted to crosslink with the electrodepositable water dispersible film forming polymer.

20. The method of claim 19 wherein the curing agent is an aminoplast.

* * * * *